United States Patent [19]

Newman et al.

[11] Patent Number: 4,666,797
[45] Date of Patent: May 19, 1987

[54] WEAR RESISTANT FACINGS FOR COUPLINGS

[75] Inventors: Harold C. Newman, Fallon, Nev.; William M. Stoll, Ligonier, Pa.

[73] Assignee: Kennametal Inc., Latrobe, Pa.

[21] Appl. No.: 597,198

[22] Filed: Apr. 5, 1984

Related U.S. Application Data

[60] Continuation of Ser. No. 468,284, Feb. 22, 1983, abandoned, which is a division of Ser. No. 265,534, May 20, 1981, Pat. No. 4,414,029.

[51] Int. Cl.⁴ .............................................. B32B 15/00
[52] U.S. Cl. ................................... 428/681; 175/374; 75/252
[58] Field of Search ............... 428/681, 682, 683, 684; 148/31.5; 175/374, 375; 75/123 J, 248, 252

[56] References Cited

U.S. PATENT DOCUMENTS

| | | | |
|---|---|---|---|
| 3,329,487 | 7/1967 | Sowko et al. | 75/123 J |
| 3,334,975 | 8/1967 | Quaas et al. | 29/182.8 |
| 3,379,503 | 4/1968 | McKenna | 29/182.8 |
| 3,539,307 | 11/1970 | Baumel | 29/182.8 |
| 3,768,984 | 10/1973 | Foster, Jr. | 29/182.8 |
| 3,800,891 | 4/1974 | White et al. | 428/684 |
| 3,989,554 | 11/1976 | Wisler | 148/31.5 |
| 4,043,807 | 8/1977 | Kirman | 75/123 J |
| 4,110,514 | 8/1978 | Nicholson | 428/683 |
| 4,228,339 | 10/1980 | Scales | 219/77 |
| 4,243,727 | 1/1981 | Wisler et al. | 428/627 |

FOREIGN PATENT DOCUMENTS 2924292  1/1980  Fed. Rep. of Germany .

OTHER PUBLICATIONS

Chemical Abstracts; vol. 77, 1972, p. 232; No. 91817a.

Primary Examiner—L. Dewayne Rutledge
Assistant Examiner—S. Kastler
Attorney, Agent, or Firm—John J. Prizzi

[57] ABSTRACT

This invention relates to mixtures of tungsten carbide, niobium metal, and molybdenum metal powders for use in the hardfacing of drill pipe couplings used in earth boring operations. It has been found that the addition of small amounts of niobium metal alone, or in combination with molybdenum, are effective to substantially submerge the tungsten carbide particles in the weld pool produced during hardfacing while, also, minimizing the occurrence of cracks which may be produced as the weld pool freezes.

9 Claims, 3 Drawing Figures

WEAR RESISTANT FACINGS FOR COUPLINGS

This is a continuation of application Ser. No. 468,284, filed Feb. 22, 1983 now abandoned.

BACKGROUND OF THE INVENTION

The present invention relates to tungsten carbide hardfacing compositions and products produced therefrom. It especially relates to those hardfacing compositions which contain monocrystalline monotungsten carbide particles, hereinafter referred to as macrocrystalline WC.

Many tungsten carbide hardfacing compositions and methods for applying these compositions are known in the art. Examples of these compositions and methods are described in U.S. Pat. Nos. 3,768,984; 4,243,727; 3,800,891; 3,334,975; and 3,329,487. Hardfacing compositions have been applied to components used in earth drilling equipment to prolong the lifetime of these components by increasing their wear resistance. For example, the teeth of multiple cone roller bits have been rebuilt using hardfacing retipping rod.

One type of retipping rod utilized contained a blend of −40 +100 mesh eutectic $W_2C$-WC, AISI 4600 steel powder, iron powder, carbon binder in the form of sugar, 0.9 to 1.32 weight percent −325 mesh niobium metal powder, and 2.07 to 4.14 weight percent −100 mesh molybdenum metal powder. This blend of hardfacing powder was contained within a hollow mild steel rod which was consumably melted onto the multiple cone teeth to be rebuilt.

Also, in the field of earth drilling, it has been observed that bulk hardfaced drill pipe couplings with a larger diameter than the drill pipe have a tendency to abrade and damage the drill casing, especially during deep well drilling. The abrasion of the casing has been related to the fact that the tungsten carbide particles in the hard-facing protrude above the steel matrix of the weld pool. One attempt to provide improved submergence of the tungsten carbide particles in the weld pool (see U.S. Pat. No. 4,243,727) involved dropping into the weld puddle at the arc, rather than at a point following the arc, as had been the practice. The higher temperatures found in the weld puddle at the arc, however, result in greater dissolution of the tungsten carbide into the steel matrix and can lead to a reduction in the toughness of the steel matrix.

Drill couplings have also been bulk hardfaced by dropping macrocrystalline WC into the weld pool. While drill couplings hardfaced in this manner are usable, they have significant amounts of macrocrystalline WC protruding above the weld pool and exhibit a significant number of cracks at the weld deposit surface.

It is, therefore, an object of the present invention to provide hardfacing powder mixtures which can be applied to wear surfaces using conventional hardfacing techniques and result in submergence of substantially all of the tungsten carbide particles in the weld pool.

It is also an object of the present invention to provide a hardfacing powder mixture utilizing macrocrystalline WC.

It is a further object of this invention to provide hardfaced wear products containing macrocrystalline WC and which are substantially free from surface cracks.

These and other objectives of the present invention will become more clearly apparent upon review of the following specification in conjunction with the attached drawings.

BRIEF SUMMARY OF THE INVENTION

In accordance with the above objectives, a hardfacing composition is provided containing tungsten carbide particles, and niobium metal powder in a small, but effective, amount to substantially submerge the tungsten carbide in the steel matrix of the weld pool while, also, producing a weld pool substantially free of cracking. Preferably, the powder mixture contains 0.05 to 0.5 weight percent niobium metal powder, 0.05 to 1.0 weight percent molybdenum metal powder, with the remainder being tungsten carbide particles.

The tungsten carbide particles utilized in the powder mixture according to this invention may be selected from the group comprising macrocrystalline WC, cast tungsten carbide (an eutectic of monotungsten carbide and ditungsten carbide), cemented tungsten carbide, and mixtures of the foregoing types of tungsten carbide particles. Macrocrystalline WC is preferred because of its greater resistance to melting and dissolution during hardfacing and its superior resistance in high abrasion environments compared to the other aforementioned tungsten carbide materials.

Most preferably, the macrocrystalline WC used should be a product of the thermit process for preparing WC disclosed in U.S. Pat. No. 3,379,503, assigned to applicant corporation.

Also provided, in accordance with the present invention, are wear components having a hardfacing layer containing macrocrystalline WC particles wherein substantially all of said particles are submerged beneath the surface of the steel matrix comprising the hardfacing weld pool. Preferably, the hardfacing steel matrix also contains niobium in a small, but effective, amount to substantially eliminate cracking and provide good submergence of the tungsten carbide in the weld pool. Molybdenum in small, but effective, amounts to enhance the effect of the niobium, also may be present in the hardfacing steel matrix.

BRIEF DESCRIPTION OF THE DRAWINGS

The exact nature of the present invention will become more clearly apparent upon reference to the following detailed specification, taken in connection with the accompanying drawings, in which.

DETAILED DESCRIPTION OF THE INVENTION

It has been found, in accordance with the present invention, that bulk hardfacing of drill pipe couplings can be greatly facilitated by the addition of at least a small, but effective, amount of niobium metal powder and molybdenum metal powder, to the tungsten carbide granules that are being applied in the hardfacing operation.

It has been found that 0.05 to 0.5 weight percent niobium metal powder and 0.05 to 1.0 weight percent molybdenum metal powder, when blended with macrocrystalline WC, will result in a drill pipe coupling hardfacing in which the tungsten carbide has been substantially submerged below the surface of the steel matrix comprising the weld pool.

Figure 1:
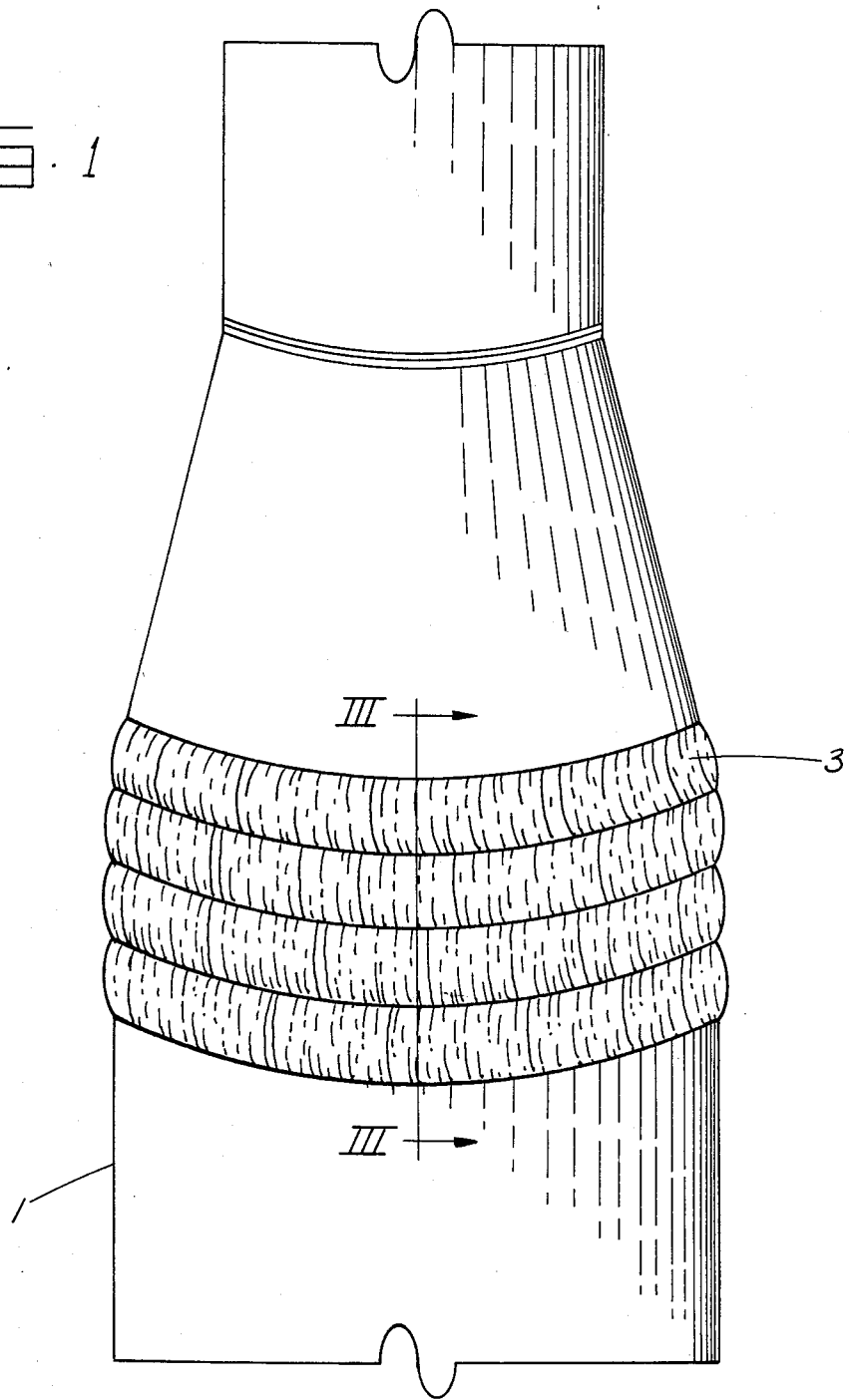
FIG. 1 is a side view of a portion of a drill pipe coupling having a hardfacing composition according to the present invention.

FIG. 1 shows a side view of a portion of a drill coupling 1 having annular bonds of hardfacing 3 that have been applied in accordance with the present invention. The hardfacing is applied in a single application by rotating the drill pipe and providing an arc between a consumable steel wire and the coupling to create a weld puddle while, also, reciprocating the wire parallel to the coupling axis. A hardfacing band is created as the macrocrystalline WC, niobium and molybdenum are being fed into the weld puddle directly behind the arc as is the usual technique practiced in the industry.

It has been found, surprisingly, that the addition of niobium and molybdenum in these small, but effective, amounts is sufficient to produce a smooth hardfacing surface in drill couplings using existing bulk hardfacing equipment without modifications as required according to U.S. Pat. No. 4,243,727. This mixture of hardfacing powders also produces a smooth surface hardfacing band which is essentially free of cracking which is a distinct advantage not typically experienced in hardbanding.

Figure 2:
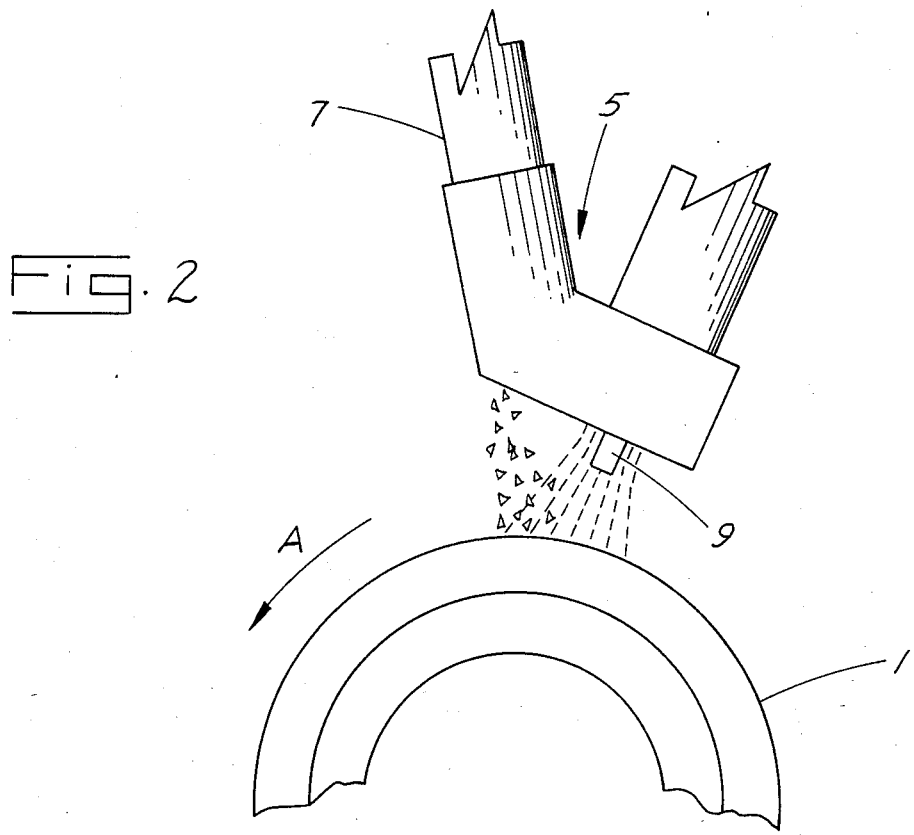
FIG. 2 is an end-on view of a coupling being hardfaced according to the present invention.

FIG. 2 is an end-on view of a coupling being hardfaced according to the present invention. A MIG automatic argon unit 5 is shown striking an arc between the consumable steel wire 9 and the coupling surface 1, while the coupling is being rotated in the direction of arrow A. Argon gas is used as a shield around the weld pool and the mixture of powders according to the present invention is dropped from a feeding device 7 which follows the mild steel electrode 9 and falls into the weld pool behind the arc area.

Figure 3:
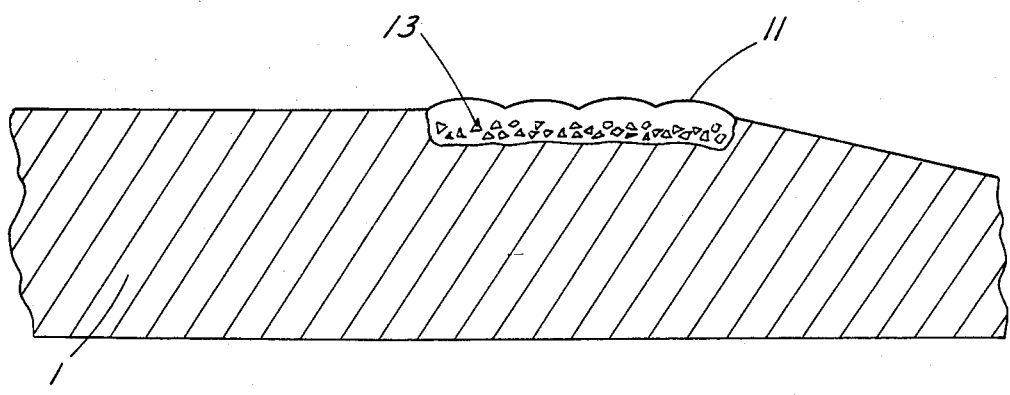
FIG. 3 is a longitudinal cross section of the drill pipe coupling taken along view III—III in FIG. 1.

A section through the resulting hardfacing or hardband 11 is shown in FIG. 3. It can be seen that substantially all of the carbide particles 13 are submerged beneath the surface of the hardband deposit.

The deposits produced contain approximately 40 to 60 weight percent tungsten carbide granules and 60 to 40 weight percent steel matrix. Upon cooling of the hard surfaced weld, typical surface cracking has not been observed and the weld is essentially free from such cracks. The hardfacing deposit itself is harder near the bottom than at the surface, and this is due to the higher concentration of tungsten carbide at the bottom of the weldment. Typical hardnesses range between 50 to 60 Rockwell "C".

While macrocrystalline WC is the preferred form of tungsten carbide to be used in this application, other forms of tungsten carbide, such as cast tungsten carbide, cemented tungsten carbide, and their mixtures with each other and macrocrystalline WC may also be used. The good submergence of the carbide and the freedom from cracking is believed to be primarily due to the addition of the niobium metal powder which is added to the mixture as a −100 mesh powder. The addition of molybdenum enhances the effect of the niobium in promoting submergence and freedom from cracking. However, molybdenum cannot be added alone to the mixture, whereas niobium can be, while still obtaining some of the benefits of the present invention. Molybdenum is also added as a −100 mesh powder.

The tungsten carbide particles themselves may have a size between 10 and 200 mesh; however, specific ranges within the broad range are preferred. For certain applications, a coarse mesh size within the range of −10 to +40 mesh are preferred, whereas in other applications, a fine mesh size within the range of −40 to +150 mesh is preferred.

The following are specific examples of hardbanded pipe couplings according to the present invention. In the following examples, a pipe coupling, as shown in the figures, was hardfaced using a MIG automatic argon unit. The pipe coupling was rotated at a speed of one revolution every 84 seconds. An arc was struck at a potential of 32 volts between a consumable mild steel weld wire and the coupling surface. The mixture of tungsten carbide, molybdenum and niobium was then fed behind the arc into the weld pool at a feed rate of 120 grams per minute to produce a deposit containing approximately 50 weight percent tungsten carbide.

EXAMPLE NO. 1

A fluid weld with good submergence of tungsten carbide and one minor crack produced on cooling was produced by the utilization of a blend of material containing 1000 grams of −60 +80 mesh macrocrystalline WC blended with 0.5 grams of −100 mesh niobium metal powder and 0.8 grams of −100 mesh molybdenum metal powder.

EXAMPLE NO. 2

This example is the same as Example No. 1, except that the amount of additives was increased. Five grams of niobium and 8 grams of molybdenum were contained in the blend used in this example. No cracking was observed on cooling of the weld pool and a 35 volt potential was used in this example.

EXAMPLE NO. 3

In this example, the same conditions were also used, as in Example No. 1, except that niobium was added in the amount of one gram and molybdenum was added in the amount of 1.6 grams. A smooth weld surface and excellent wetting of the carbide was produced with substantial submergence of all carbide beneath the surfaces of the weld.

Modifications may be made within the scope of the appended claims.

What is claimed is:

1. A coupling for drill pipe used in earth boring operations, said coupling comprising: annular rings of hardfacing on the exterior; said rings of hardfacing comprising macrocrystalline WC substantially submerged in a steel matrix; said steel matrix being substantially free of cracking; and wherein said steel matrix contains niobium in a small, but effective, amount ot substantially submerge said macrocyrstalline WC in said steel matrix.

2. The coupling according to claim 1 wherein said macrocrystalline tungsten carbide particles have a size between 10 and 200 mesh.

3. The coupling according to claims 1 or 2 wherein said niobium is present in a small, but effective, amount to substantially eliminate cracking.

4. The coupling according to claims 1 or 2 wherein said steel matrix contains niobium and molybdenum in small, but effective, amounts to substantially eliminate cracking.

5. The coupling according to claim 3 wherein said niobium is present in the amount of 0.05 to 0.5 weight percent.

6. The coupling according to claim 4 wherein said niobium is present in the amount of 0.05 to 0.5 weight percent and said molybdenum is present in the amount of 0.05 to 1.0 weight percent.

7. A coupling for drill pipe used in earth boring operations, said coupling comprising:
annular rings of hardfacing on the exterior of the coupling;
said rings of hardfacing comprising a steel matrix deposited as a weld pool containing hardfacing powders fed therein, said hardfacing powders including macrocrystalline WC and niobium metal powder, said niobium metal powder being in an amount between 0.05 to 0.5 weight per cent and being effective to substantially submerge said macrocrystalline WC in the weld pool and substantially eliminate cracking of the hardening weld pool.

8. The coupling of claim 7 wherein said hardfacing powders further include a molybdenum metal powder.

9. A coupling for drill pipe used in earth boring operations, said coupling comprising: annular rings of hardfacing on the exterior of said coupling; said rings of hardfacing comprising a steel matrix deposited as a weld pool on the exterior of said coupling and hardfacing powders fed into said weld pool wherein said hardfacing powders include macrocrystalline tungsten carbide particles, 0.05 to 0.5 weight percent niobium metal powder and 0.05 to 1.0 weight percent molybdenum metal powder.

* * * * *